United States Patent
Morrow

(10) Patent No.: US 9,459,601 B2
(45) Date of Patent: Oct. 4, 2016

(54) MULTI-SENSOR, EVENT BASED OCCUPANCY DETERMINATION AND LOAD MANAGEMENT SYSTEM

(71) Applicant: Wayne Logan Morrow, Fort Lupton, CO (US)

(72) Inventor: Wayne Logan Morrow, Fort Lupton, CO (US)

(73) Assignee: Starfield Lighting Automation LLC, Fort Lupton, CO (US)

( * ) Notice: Subject to any disclaimer, the term of this patent is extended or adjusted under 35 U.S.C. 154(b) by 245 days.

(21) Appl. No.: 13/859,791

(22) Filed: Apr. 10, 2013

(65) Prior Publication Data

US 2014/0309758 A1    Oct. 16, 2014

(51) Int. Cl.
*G05B 19/42*    (2006.01)
*G05B 15/02*    (2006.01)

(52) U.S. Cl.
CPC ....... *G05B 15/02* (2013.01); *G05B 2219/2642* (2013.01)

(58) Field of Classification Search
CPC ................. G05B 15/02; G05B 2219/2642
USPC ........................ 700/1, 89, 286–296
See application file for complete search history.

(56) References Cited

U.S. PATENT DOCUMENTS

| | | | |
|---|---|---|---|
| 6,388,399 B1 | 5/2002 | Eckel | |
| 7,486,193 B2 | 2/2009 | Elwell | |
| 8,009,042 B2 | 8/2011 | Steiner | |
| 8,258,654 B2 * | 9/2012 | Parsons | H05B 37/0227 307/116 |
| 8,731,689 B2 | 5/2014 | Platner | |
| 8,909,382 B1 * | 12/2014 | Malakuti | G05D 25/02 315/131 |
| 8,970,342 B2 | 3/2015 | Schmidt | |
| 8,970,372 B2 | 3/2015 | Primous | |
| 9,233,472 B2 * | 1/2016 | Angle | H04L 12/282 |
| 2007/0182580 A1 * | 8/2007 | Elwell | H05B 37/0227 340/6.11 |
| 2010/0052574 A1 * | 3/2010 | Blakeley | G08B 13/191 315/307 |
| 2013/0085609 A1 * | 4/2013 | Barker | G05B 15/02 700/276 |
| 2014/0001977 A1 * | 1/2014 | Zacharchuk | H04L 12/2816 315/291 |

OTHER PUBLICATIONS

LS230 1D Dual Technology DALI Occupancy Sensor, Starfield Lighting Automation, Publication MP730 1.4.4 130820.

* cited by examiner

*Primary Examiner* — Mohammad Ali
*Assistant Examiner* — Ziaul Karim
(74) *Attorney, Agent, or Firm* — Maier & Maier, PLLC

(57) ABSTRACT

An improved occupancy detection and load management system wherein a plurality of scout sensors and their surrogates may be networked to a master controller to control the load of a designated control zone. When occupancy is detected by an actual sensor or a sensor surrogate, scout sensors report only that event and each event, regardless of source, has the potential to initiate or sustain the occupied state of the master controller. As a zone becomes unoccupied, event reports stop being sent allowing the master controller to time out and exit its occupied state. Loss or addition of scout sensors does not affect operation as the master does not track individual sensors which additionally allows event reports to be created and sent by plurality of sources including momentary contact buttons, user controls, personal computers, and other building automation systems like fire alarms, security, and access control.

9 Claims, 5 Drawing Sheets

System Deployment

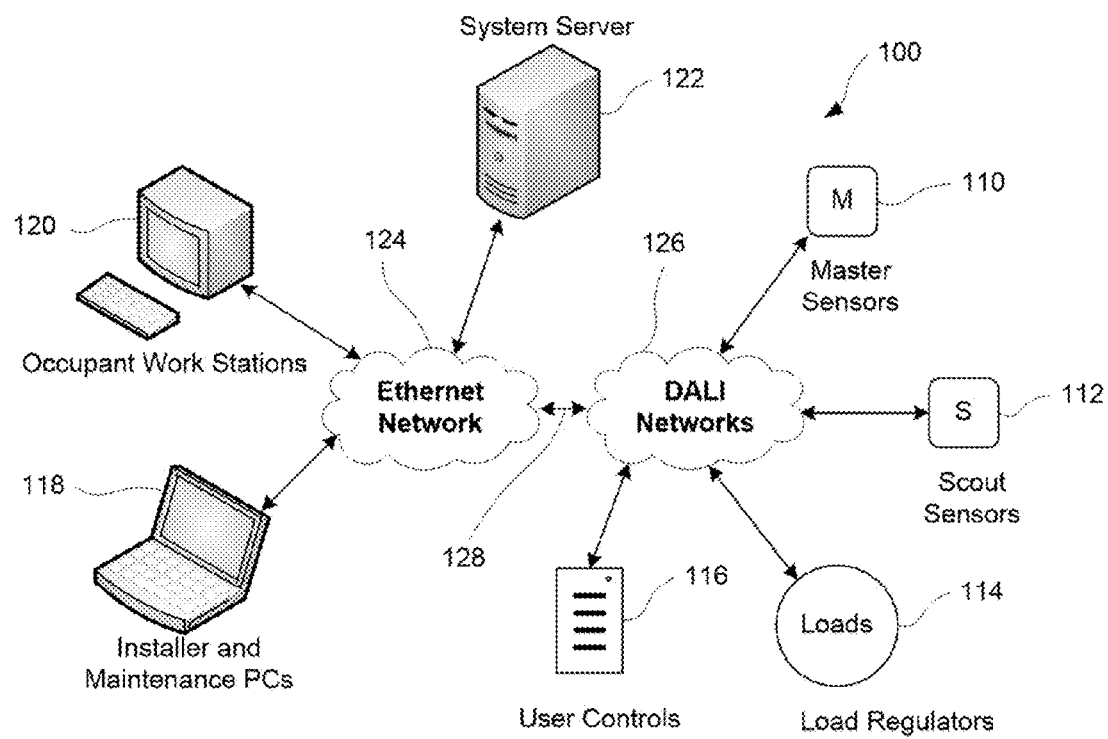
Fig 1 – System Deployment

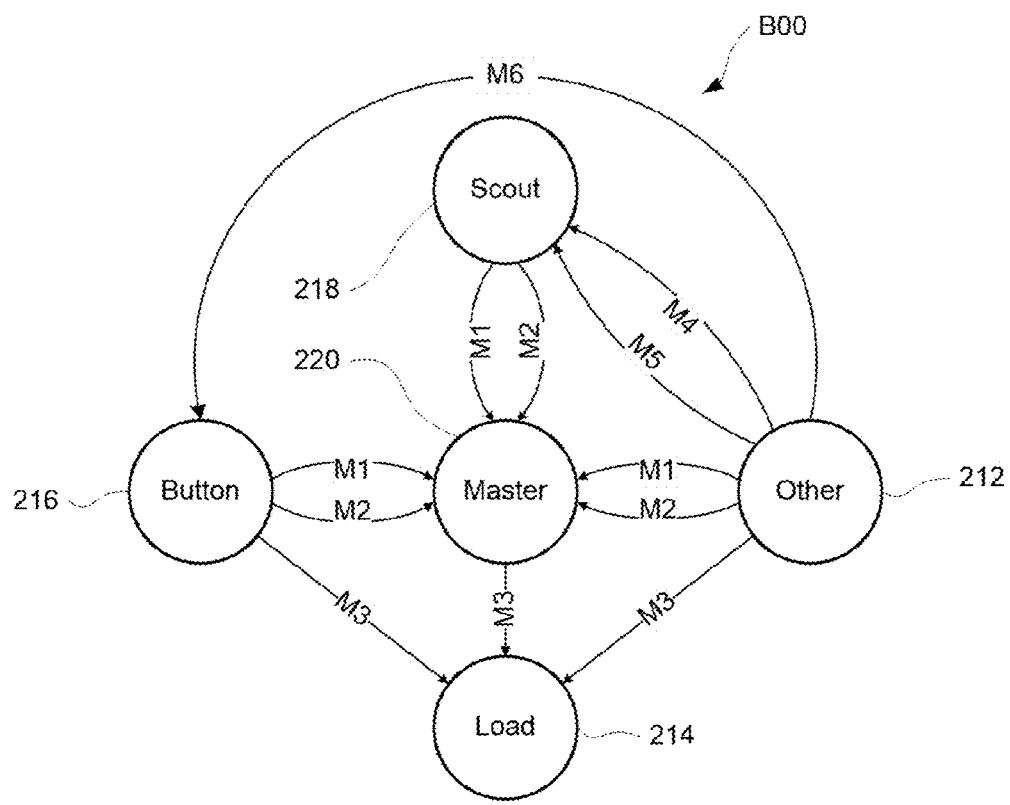
Fig 2 – Zone Control Static Diagram
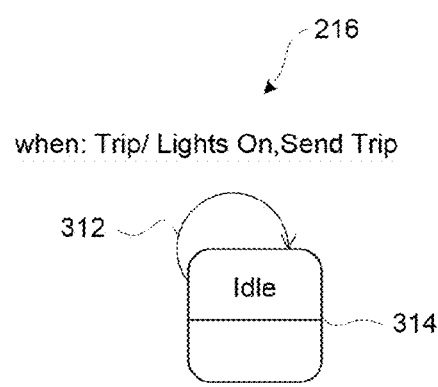
Fig 3 - Button Control Object Item 216

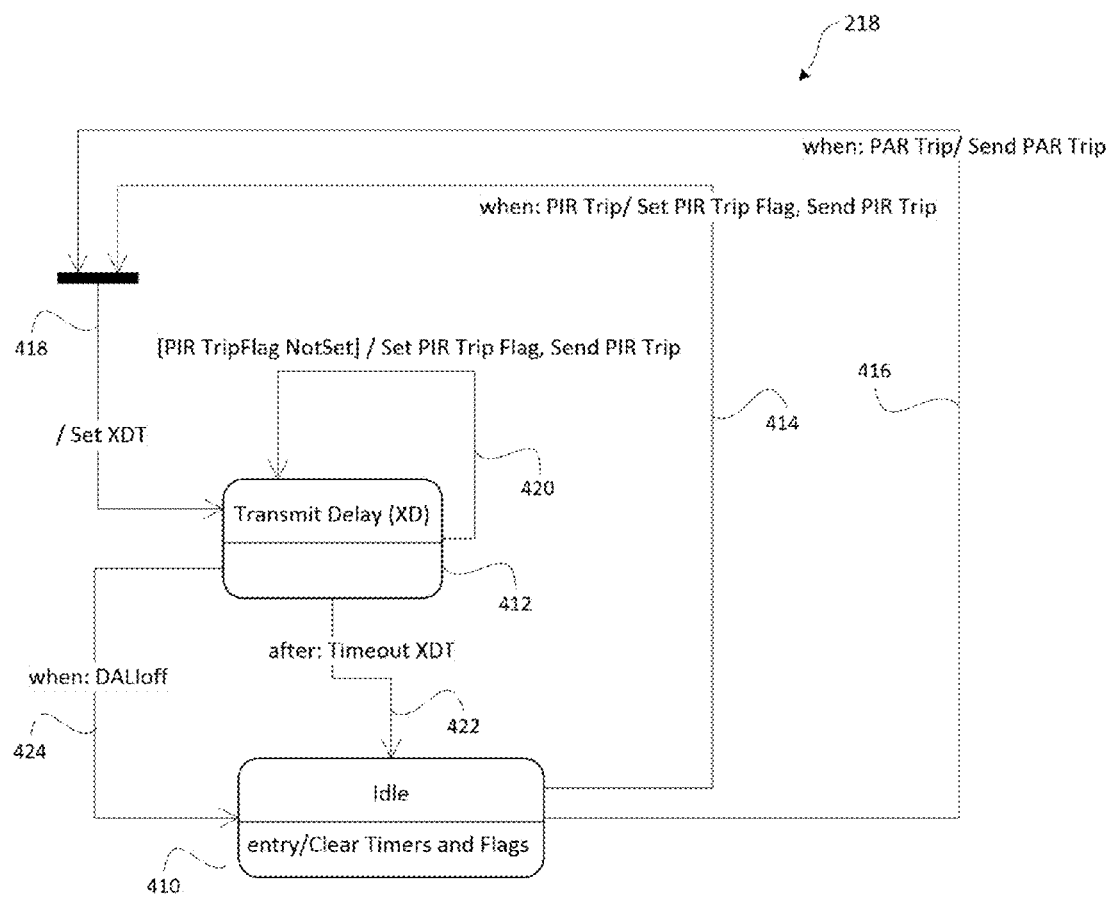
Fig 4 - Scout Control Object
Item 218

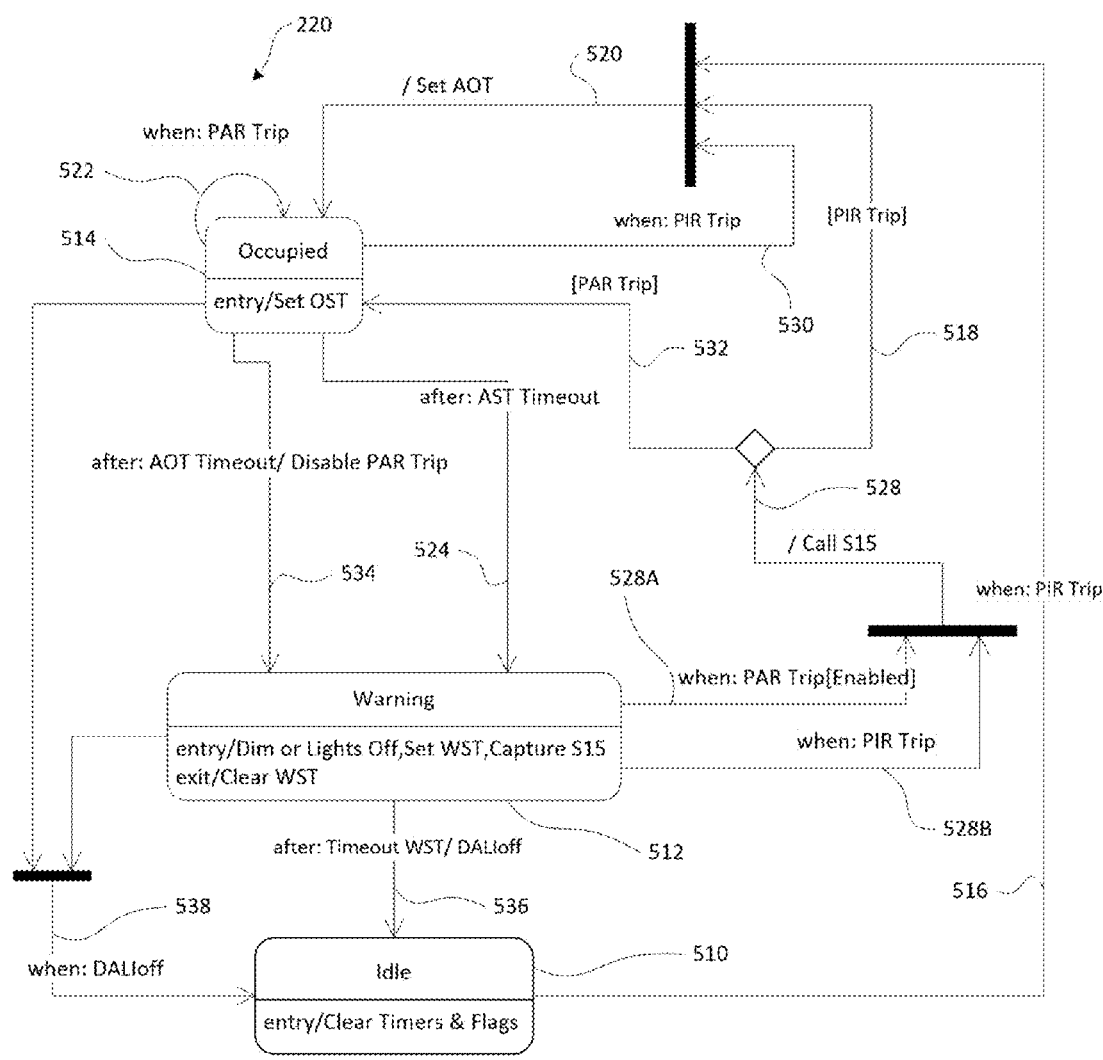
Fig 5 - Master Control Object
Item 220

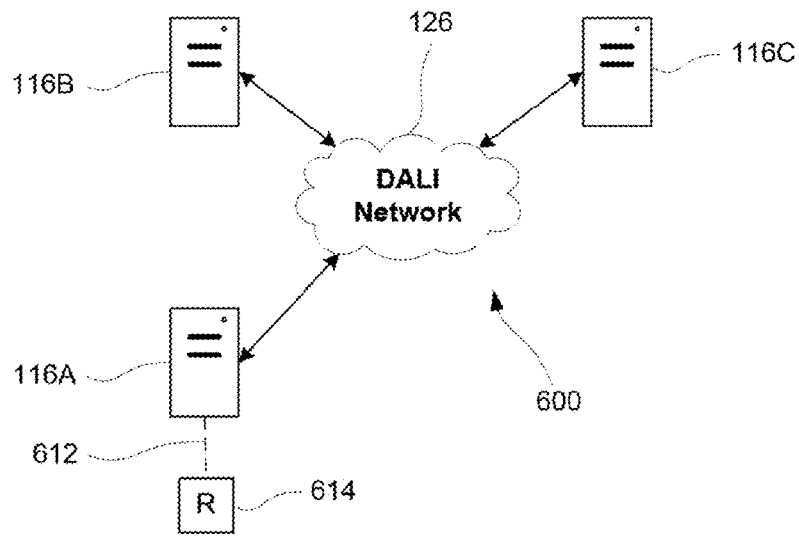
Fig 6 - Switch Timer Deployment Diagram
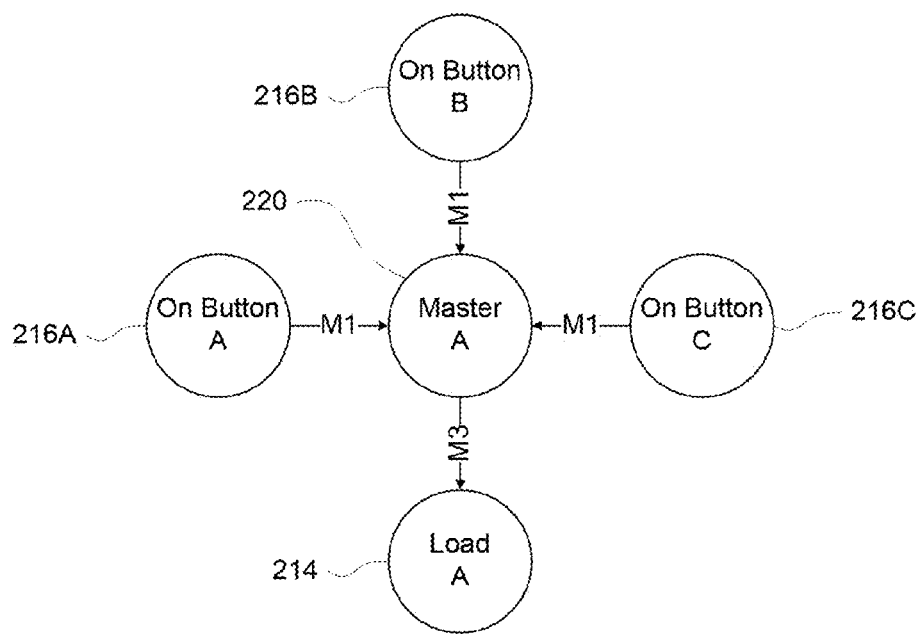
Fig 7 - Switch Timer Static Model

MULTI-SENSOR, EVENT BASED OCCUPANCY DETERMINATION AND LOAD MANAGEMENT SYSTEM

BACKGROUND OF INVENTION

1. Field of the Invention

The present invention relates primarily to occupancy based load management systems for lighting, plug-load, and similar loads being managed to reduce energy use or to provide response to emergency and security inputs.

2. Description of the Related Art

Prior art occupancy based load management is based on onymous or named communication between an occupancy detection sensor and a zone controller. These two components determine if a zone is occupied and then modulate a connected electrical load accordingly. The basic operation of this communication was worked out over 20 years ago. A sensor detects motion, sound or another proxy for human presence and then communicates that status to a load controller that has traditionally been a relay.

Conventional Occupancy logic switches on the connected load when a zone becomes occupied and switches off that load when the zone becomes unoccupied. With more recent Vacancy logic the auto-off step is retained but the load is turned on manually. In actual operation, occupancy detection is often spotty so a delay timer is added to smooth out the process by creating a window of time during which the detected occupancy will reset the delay timer to keep the lights on.

The above process can also be described in terms of states. The zone starts in an unoccupied or idle state and changes to an occupied state when occupancy is detected. If the sensor is configured for occupancy logic there is an action associated with the state change to switch on the connected load. If vacancy logic is being used the load is assumed to be turned on manually. The occupied state continues until the occupied state timer times out. This timer is set to its timeout period each time that an occupancy proxy event is detected. If no proxy event is detected the timer times out and the auto-off process begins.

Multi-Sensor Operation—When zones are too large for a single sensor, multiple sensors are typically used to cover the space. The conventional solution has been to parallel wire multiple stand-alone sensors to a single load controller. When any one sensor detects presence and trips (changes from its idle to occupied state) it closes an internal switch which activates the controller. If the controller is a relay, the relay solenoid activates which then closes the relay and switches on the connected load. As more sensors detect occupancy, they also trip but no additional action occurs because the zone is already in the occupied state. However, as the zone becomes unoccupied all the parallel wired sensors must return to their idle state before the zone becomes fully unoccupied and the electrical load is allowed to turn off. In Boolean logic terms the on function is an OR gate and the off function is an AND gate.

The parallel wired approach has worked well but is cumbersome and restrictive. Parallel wired sensors require long cable runs and 3-wire polarized connections that can be miss-wired. They also have limited capacity due to available power of the controller. Power limits can be addressed by power boosters but in larger rooms and corridors there is little that can be done about long cable runs. Additionally, adding additional sensors or making other changes to the zone operation require rewiring and each sensor adjustment must be made manually at each sensor. In small applications these limitations are likely not significant but in larger buildings the act of individually maintaining hundreds and even thousands of sensors can be overwhelming.

Networking sensors together has the potential to addresses these problems. However, as occupancy sensors have been adapted to networking, much of their operation has not changed. Prior art networked sensors continue to operate as independent devices and act as if they were parallel wired. In order to make this work the zone controller must know how many sensors are covering a zone and must then keep track of the state of each sensor. This is done with an onymous communication from each sensor that is sent each time the sensor changes state.

To avoid these problems U.S. Pat. No. 8,009,042 B2 limits the number of sensors allowing the sensors and zone controller to be preconfigured. Zones with a variable number of sensors can be supported but only by offering products that are preconfigured for varying number of sensors or by providing some form of field configuration to set up the zone for a fixed number of sensors.

U.S. Pat. No. 8,009,042 B2 also acknowledges another problem with prior art networked sensors wherein the loss of any sensor in the occupied state will prevent the virtual circuit from clearing and returning to the unoccupied state. U.S. Pat. No. 8,009,042 B2 addresses this problem by adding a heartbeat function to detect any missing sensors but the fundamental problem caused by state-based logic remains.

Thus, what is needed is a new approach. Advanced lighting control systems with sophisticated interactive occupancy detection, daylighting, and user control are becoming increasingly common due to their capacity to significantly reduce energy use and to deliver an enhanced work environment. However, as these systems become larger and more complex so too do the associated problems of installation, operation, maintenance, testing, and emergency operation. Networked systems have the potential to meet these new demands but the systems need to be flexible and adaptable enough to fully cover all spaces with minimal installation and be robust enough to detect problems and continue working even when sensors fail or are added, removed, or reconfigured.

SUMMARY OF THE INVENTION

The present invention uses stateless sensors and anonymous communication to create a more robust and functional lighting control system that is easier to configure, supports an unlimited number of sensors, allows sensors to added or removed, and supports remote operation, testing, and management.

Where known prior art systems use multiple, state-based, independent sensors the present invention introduces an improved Master-Scout event reporting concept wherein multiple Scout sensors send anonymous, stateless, event reports to a single Master zone controller. When an occupancy event is detected, Scout sensors report only that event. Each trip, regardless of source, has the potential to initiate or sustain the occupied state of the Master controller. As a zone becomes unoccupied, trip reports stop being sent allowing the Master control to time out and return to its idle state. Loss or addition of sensors does not affect operation because the Master does not need to know of or track individual sensors. Additionally, without the need to track individual sensors system functionality is greatly increased. The present invention allows trip reports to be created and sent by plurality of sources—not just other occupancy sensors— including momentary contact buttons, user controls, personal computers, and other building automation systems to include fire alarm, security, and access control.

Vacancy Logic

Vacancy logic with manual-on and auto-off load control has many advantages. Besides being more energy efficient, it is also inherently more reliable and intuitive for most applications. Because control systems cannot read minds, determining a user's actual intent is not possible. The best we can do is to use a proxy like motion or sound that detects physical behavior. However, with vacancy logic there is no uncertainty. If a user wants the lights or other loads on then they manually turn them on. Released from their conventional auto-on function, occupancy sensors no longer need to cover all entrances into a zone. This allows sensors to be specified and located to optimize coverage of high value areas like desks or the center of a conference room. However, there is a problem. If a user turns on lights without subsequently tripping the occupancy sensor the auto-off sequence is not initiated and the lights will not turn off. The present invention solves this problem by allowing the wall control to not only turn on lights but also send a trip report to the Master to initiate the auto-off sequence; whereby, lights will always turn off even if the occupancy sensor itself is not physically tripped.

Group Addressing

Another feature of the present invention is multiple group addressing. In addition to each zone having a unique zone or group address the present invention allows each Master zone controller to respond to broadcast commands and additional group commands. This capacity means that groups of Master controls can be created to cover not only a single room but also other larger control zones to include work areas, building floors, whole buildings, and even whole campuses. Applications include testing and system-wide response to emergency operation.

Testing and Documentation

In large and even smaller buildings testing and ongoing maintenance of systems can be difficult and expensive. Individual sensors can be locally tripped of course but even if the basic cost of getting to a room is ignored some rooms may be inaccessible and systematic field testing and documentation are inherently problematic. The present invention resolves this problem by providing the capacity to trip individual and groups of sensors remotely. Coupled with the ability of some networked lighting control systems to monitor the status of lighting objects, the system can be tripped and then queried to verify response. After a designated timeout, the system can again be queried to verify the expected response. With appropriate software the results of this type of test can also be captured to produce initial and ongoing system performance verification and documentation.

Interface to Other Systems

Emergency response is another critical function. Many known prior art systems do have the ability to turn lights on and off in response to emergency events but this can be intrusive as it can be difficult to know when to turn lights off after the emergency event is over. The present invention resolves this problem by allowing an emergency event to trip the Master zone controllers. If occupancy logic is being used the lights will turn on. If vacancy logic is being used tripping and turning the lights on can happen concurrently. In both cases the auto-off cycle will be initiated allowing unoccupied zones to respond to local conditions so that occupied zones stay on and unoccupied zones turn off. This capacity improves overall performance by assuring the required emergency response while reducing energy use and providing more intuitive operation.

DALI Auto-On Function

As part of its initial and emergency response operation, the DALI protocol requires that DALI ballasts turn on each time lighting power is cycled. In the event of a power outage longer than about 500 ms all DALI controlled lights will turn on. This can be a problem if the power cycle event happens late at night or at another time when the building is otherwise unoccupied. The present invention resolves this problem by providing an optional function that trips Master zone controllers to begin the auto-off sequence each time the DALI control power is cycled. If a particular room is occupied the lights stay on, otherwise, the zone times out and turns off.

Switch Timers

Delay-off switches are another embodiment of the present invention. In some areas the use of occupancy sensors may not be possible or economically justified. A typical application is unfinished space. Building codes typically require lighting and some form of auto-off control but placing occupancy sensors throughout the space may be unwarranted. In these and similar cases a delay timer can be used. Known prior art systems can support this kind of function with a simple twist timer but coordinating this function in rooms with multiple entrances can be problematic. Central relay panels can also be used but in addition to the cost of relay panels and home-run wiring this application typically requires occupancy sensors.

The present invention resolves this problem by allowing networked switches at each entrance to act as occupancy sensors. One switch is configured for Master control and occupancy logic while the others are set up as Scouts. When an on-button is pressed, a trip message is sent to the Master controller to turn lights on and initiate the auto-off sequence. Pressing any on-button in the space acts like a normal occupancy sensor and resets the occupancy delay timer to sustain the occupied, lights-on state. When the space becomes unoccupied the delay timer times out and turns off the lights. This approach has the additional advantage of being able to link the space into the lighting control system to provide a standard full function occupancy interface that includes adjustable occupancy delay time, remote control and monitoring, and a warning period that blinks or dims the lights before turning off.

Multiple Sensor Technologies

Occupancy detection with multiple sensor technologies is another application of the present invention. Multi technology occupancy detection is well established in prior art applications but in addition to the same problems of onymous communication and state tracking described above multiple technology sensors have an additional problem that occurs when sensor outputs must be treated differently. The problem occurs when different sensor technologies are used to cover a space. Prior art wired systems are able to side step the problem by resolving all sensor inputs to a single state change and switch closure. However, some sensor combinations like PIR and audio range acoustic may require that sensor events be treated differently. The present invention allows for this by enhancing its communication protocol to include multiple message types that identify sensor trips by their technology type. With this additional information the Master zone controller can then process each type of sensor trip separately in order to provide complete multi-sensor, multi technology benefits.

Other features and advantages of the present invention will become apparent from the following description of the invention that references the accompanying drawings.

BRIEF DESCRIPTION OF THE DRAWINGS

FIG. 1 is a simplified system deployment overview of a lighting control system with a variety of actors and actor surrogates having input into the system where actors are actual persons and actor surrogates are items like sensors and scheduling means that operate on the system through algorithms that embody actor intensions.

FIG. 2 is a simplified static diagram of zone control showing the interaction of objects within the system.

FIG. 3 is a simplified state diagram of a button control object.

FIG. 4 is the state diagram of a Scout control object.

FIG. 5 is the state diagram of a Master control object.

FIG. 6 is a simplified deployment diagram of a switch timer embodiment.

FIG. 7 is a Switch Timer Static Model.

DETAILED DESCRIPTION OF THE INVENTION

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts through the several views of the drawings, it being understood, however, that the invention is not limited to the specific methods and embodiments disclosed.

FIG. 1 is a simplified system deployment diagram of the preferred embodiment of the present invention showing the primary physical components. All of these components are linked together via a common communication network which is a combination of a fast Ethernet backbone network 124 and a plurality of smaller, slower local DALI networks 126 connected through a plurality of network gateways 128. Each of these components are called network nodes or just nodes and have the capacity to communicate with the network and to store and run computer instructions. Computer instructions that run on these nodes are bundled together into discrete firmware packages called objects. Each object is an instance of a set of computer instructions called a class and each object is made unique by property settings and a unique identification.

Master and Scout devices 110 and 112 are both nodes and sensor platforms. They may be physically identical but configured to operate differently. Scouts have an activated Scout object 218 and perform the job of detecting and reporting occupancy events to the Master object 220 via the DALI network 126. User controls 116 are nodes that connect to the DALI network 126 and have the capacity to host objects including buttons 216, Scout 218, and Master 220 objects. DALI loads 114 are nodes that host DALI load control objects and have means of regulating an electrical load. Examples of DALI loads include dimming ballasts, incandescent dimmers, DALI to 0-10 v gateways, and digital outputs connected to relays. These devices may be stand alone or included with other nodes such as the preferred embodiment where all Scouts and Master nodes include a digital output that can drive a self-powered relay or communicate with other devices and systems. Occupant workstations 120, laptops 118, and a system controller/server 122 can also host control objects and communicate with Scout 218, Master 220, and button 216 objects via the network.

FIG. 2 is a simplified static diagram of a single zone that shows the relationship between the control objects. A typical zone is identified by a unique zone address and has one Master control object 220 and a plurality of support objects consisting of buttons 216, Scouts 218, and loads 214. Additionally, there may be any number of external objects and support programs 212 that can also provide control messages. Masters objects 220 process both local and remote sensor input in order to determine the occupied status or state of a zone and use this information to regulate electrical loads via instructions to the DALI load objects 214.

Objects interact to determine the occupied state of a zone and regulate the zone load by sending and receiving messages to or from the zone address eliminating the need to identify and track individual addresses. These messages are labeled M1 through M6 and support two sensor types. A first sensor type of the preferred embodiment is a PIR (Passive Infrared) sensor that detects motion by monitoring changes in infrared energy. A second sensor type is a PAR (Passive Audio Range) sensor that detects occupancy by listening for non-periodic sound. When a Scout detects an event it informs the Master by sending an M1 report for a PIR event and an M2 report for a PAR event.

The job of the M1 and M2 reports is to inform the Master control object that an occupancy event has occurred. These events may have been created by actual sensors or alternatively by some other action like a button press. Regardless of actual source, the Master control object treats all M1 and M2 reports the same without regard to origin or state allowing the reports to be both anonymous and stateless.

A third message type M3 may be sent to the load control objects. In the preferred embodiment this message format conforms to the open source DALI protocol and may be any command that instructs the DALI load control object to regulate an electrical load. On-commands include goto-level, goto-scene, goto-minimum, and goto-maximum all of which regulate loads via various actuators including relays, dimming ballasts while off-commands include off, off with fade, and step down and off. Within this specification these command groups are called DALIon or DALIoff commands and may be generated by a variety of sources including user interface objects 216, Master controller objects 220, and other objects 212.

A fourth and fifth message type, M4 and M5, are also supported. Like M1 and M2, these messages are also commands which are anonymous and stateless and are tagged as being created by a first or second sensor type. These commands are only processed by Scout sensors in order to simulate a Scout trip which in-turn generates an M1 or M2 trip report that is sent to the zone Master controller. In this way Scout sensors can be remotely tripped while the monitoring the Master controller in order to verify that the Scouts are configured and operating properly.

A sixth message type, M6, is additionally supported which operates like M4 and M5 commands but simulates the physical act of pressing a button. This command may be used to test the configuration and operation of user interfaces as well as allowing user interface buttons to be remotely operated to provide expanded user and automatic control.

FIG. 3 is a simplified state diagram of a button control object 216 configured for the preferred embodiment of vacancy logic. The button has one state, idle 314. When the button is pressed it creates an event 312 and a set of actions 216. The first action is to send an M3 message to Load object 214 to turn lights on. The second action 216 is to send an M1 or M2 message to the Master control object 220 to initiate the auto-off sequence.

FIG. 4 is a simplified state diagram of the Scout control object 218 configured for the preferred embodiment of two sensor technologies 414 and 416 and a transmit delay timer 412. In this embodiment the first sensor technology is a Passive Infrared (PIR) motion sensor and the second is a Passive Audio Range (PAR) acoustic sensor. PIR sensors have excellent line-of-sight characteristic but cannot "see" through barriers. PAR sensors detect sharp changes in audio-range sound that allows them to "hear" both directly and around barriers. The two technologies complement each other to provide a level of detection superior to what either can do by itself however the two sensor types must also be processed differently to assure optimal performance. The embodiment also incorporates logic to reduce network traffic by introducing a delay between trip reports and logic to assure that PIR trips are always reported even if the Scout has been previously tripped by the PAR sensor.

The state diagram begins with the sensor in its idle state 410. When either sensor trips or an M4 or M5 trip report is received, the Scout object changes from said idle state 410 to the transmit delay state (XD) 412. If the trip is from a PIR sensor or M4 trip command then an M1 trip report is sent followed by a second action to set the PIR trip flag 414. If the trip is from a PAR sensor or a M5 trip command then an M2 trip report is sent 416. Either type of trip starts the transmit delay timer (XDT) 418 before entering the transmit delay state 412. However, if the trip came from a PAR sensor 416 the Scout will still respond to a PIR sensor trip, send an M2 trip report, and set the PIR trip flag 420. When the XDT times out 422 or a DALIoff command addressed to the designated control zone or parent zones thereof is detected 424, the Scout object 218 clears the XDT and returns to its idle state 410 wherein the PIR trip flag cleared so that the Scout is ready to process another trip event.

FIG. 5 is a simplified state diagram of the Master control object 220 configured for the preferred embodiment of vacancy logic and first and second PIR and PAR sensors. The embodiment demonstrates the advantage of being able to process the two sensor technologies differently. PAR sensors are more susceptible to false tripping so the Master typically only allows a PIT trip to initiate a change from the idle state 510 to occupied state 514. However, once in the occupied state 514, acoustic trips are accepted but only for a limited time which is reset each time a PIR trip is detected 530 and 528B.

The state diagram begins with the Master object 220 in its idle state 510. When the PIR sensor trips or an M1 message is received 516, the object 220 moves from its idle state 510 to its occupied state 514 while setting the AOT (Acoustic Override Timer) 520. Upon entry into the occupied state 514 the OST (Occupied State Timer) is set. While in the occupied state 514, a trip of either a PIR 522 or PAR sensor 530 or the receipt of either an M1 or M2 reports from a Scout or other source resets the OST to sustain the occupied state 514. However, the two sensors and their associated M1 and M2 reports are not treated the same. A PIR sensor trip has the additional job of setting the AOT 520 while a PAR sensor trip 522 only resets the OST 514.

The occupied state is sustained until the either the OST 524 or the AOT 534 times out or a DALIoff command addressed to the designated zone or parent zones thereof is detected 538. In the preferred embodiment both the OST 524 and AOT 524 timeout events move the object 220 to a warning state 512. However an AOT event 534 also disables any further PAR trips 534. Upon entry into the warning state 512 a sequence of actions occurs. First, commands are sent to the DALI load control objects in the designated control zone 214 to capture their current light level to their scene 15 then to dim or turn off depending on their load type, followed by a final internal command to set the WST (Warning State Timer) to its timeout value.

The warning state is sustained until a recognizable sensor trip event 528 occurs, the WST times out 536, or a DALIoff command addressed to the designated control zone or parent zones thereof is detected 538 is detected. recognizable sensor trip or trip command 528 causes the object 220 to return to its occupied state 514 after first sending a DALI command to DALI load control objects in the designated control zone to return to their scene 15 value 528. If the trip originates from the PIR sensor or M1 trip report 518 then the AOT 520 is also set. If a trip event is not detected or said DALIoff command is detected the Master object returns to its idle state 510. Entry into the idle state clears all timers and flags whereupon said object 220 is ready to respond to another trip event.

Master controllers configured for automatic-on operate the same way except for incorporating an action to send a DALIon command to DALI load control objects in the designated control zone 214 during the idle to occupied state transition 516.

FIG. 6 is a simplified deployment diagram of a three station 116 switch timer system wherein a single electrical load is regulated by a relay 614. In this embodiment there are no occupancy sensors. Rather, users entering a space manually turn on the lights from any one of the three stations by pressing an on-button. Lights are turned off by manually pressing the off button at any user control or after a timeout period has passed.

The three stations 116A, 116B, 116C are all connected to a DALI network 126 and each station is configured with two buttons, one for on and one for off. In addition to user buttons one of the stations also hosts a Master control object 220. Except for the physical difference of not having occupancy sensors, the embodiment operates the same and uses the same Master Control Object logic detailed in FIG. 5. This is a significant advantage over prior art system as it allows this special application to be configured, operated, and maintained using the same user interfaces, concepts, and equipment as systems that have occupancy sensors.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An occupancy detection system comprising:
   a. a master controller for sending and receiving messages and processing occupancy detection event messages in accordance with a predefined computer algorithm, wherein said master controller is a bundle of computer instructions called an object that is hosted by a computer processor physically located inside or outside of a controlled zone and within devices including one or more of sensors, relays drivers, and other input and output devices;
   b. a plurality of scout devices for sending said occupancy detection messages in response to real or simulated occupancy detection events wherein said scout device is a bundle of computer instructions called an object that is hosted by a computer processor physically located inside or outside of a controlled zone and within devices including one or more of sensors, relays drivers, and other input and output devices, and c. a communications network transmitting said occupancy detection messages, whereby robust, flexible networks of a plurality of sensors and other scout devices are built such that the addition or loss of one or more scout devices does not affect operation, wherein said occupancy detection system is forced to return to an idle state in the event that the electric loads in the controlled zone are turned off, wherein the occupancy detection system further comprising:

I. listening for off type commands addressed to the controlled zone or parent thereof, and II. clearing all timers and flags and then returning all said master and scout objects to their idle states, whereby it is assured that the occupancy detection system stays synchronized with the lighting state, auto-on zones which are inadvertently turned off while occupied will turn back on immediately as soon as occupancy is detected, and said master controllers with auto-on logic can be field tested by sending an off command to the zone to reset all sensors to their idle state;

wherein said scout devices reduce network traffic by limiting the frequency of occupancy event transmissions, and configured to:

a. change from the idle state to the active state upon an occupancy trip event by either a first or second occupancy sensor, b. transmitting a first or second occupancy event message, c. setting an active state delay timer, d. ignoring additional occupancy trip events while in said active state, e. clearing-all memory flags and returning to the idle state when the active state delay timer times out.

2. The occupancy detection system of claim 1 wherein said master controller further controls electrical loads directly or via transmitted messages.

3. The occupancy detection system of claim 1 wherein said occupancy detection event messages contain additional information including a type of occupancy event, whereby said master controller considers the type of occupancy event when processing an event message.

4. The occupancy detection system of claim 1 wherein said master controller algorithm includes a time delay function to prevent secondary sensor detection events from maintaining an occupied state without periodic verification of a PIR or similar line-of-sight sensor.

5. The occupancy detection system of claim 1 wherein said communications network consists of a wired or wireless medium and communications protocol to include ETHERNET, DALI, and ZigBee.

6. The occupancy detection system of claim 1 wherein event messages may originate locally from within the controlled zone, remotely from outside the controlled zone, or from within the physical device hosting the Master or Scout object.

7. The occupancy detection system of claim 1 wherein said occupancy event messages may be produced by a variety of changing conditions including motion, sound, user actions that include operation of momentary contact buttons, keyboards, mice, and graphical user interfaces, and by user surrogates that include scheduled events and interfaces with other building control systems, whereby the occupied state and one or more functions it controls can be controlled, tested, and managed based upon a variety of detected, simulated, and inferred occupancy events.

8. The occupancy detection system of claim 1 wherein a warning period is added to the master controller wherein the master controller further configured to:

c. change from an active to a warning state upon time out of an active state delay timer precluded by a first action of sending a message to one or more zone load control objects to capture and store a present light level to a designated scene value followed by a second action of sending a message to said one or more zone control objects to either dim or turn off followed by a third action of setting a warning state delay timer to a timeout value, and d. change from the warning state to the active state upon receiving an occupancy event message precluded by a fourth action of sending a message to the one or more zone load control objects to either return to the designated scene value or return to a fixed light level, and e. change from the warning state to the idle state upon the timeout of the warning state delay timer, whereby one or more occupants in zones with vacancy logic are given an opportunity to return to the active state and restore the light level before the light level is reactivated manually.

9. The occupancy detection system of claim 1 wherein said scout devices further assure that a high priority occupancy event is immediately transmitted at least once per transmit delay period even if a scout device is already in the transmit delay state, and further configured to:

a. set a memory flag each time a first sensor occupancy transmission event occurs, b. send a first sensor occupancy event message if said memory flag is not set regardless of the state of the scout device, whereby it is assured that automatic-on systems that can only be tripped by a PIR or other high priority trip event always react immediately even if a previous lower priority trip event has put said scout device into a network traffic reduction state.

* * * * *